US012421139B2

(12) United States Patent
Fabian et al.

(10) Patent No.: US 12,421,139 B2
(45) Date of Patent: Sep. 23, 2025

(54) APPARATUS AND PROCEDURE FOR CAVITATION WATER PURIFICATION

(71) Applicant: C.E.S. FONIX CLEAR WATER KFT., Veröce (HU)

(72) Inventors: Jozsef Fabian, Nyíregyháza (HU); Jozsef Stingl, Nyíregyháza (HU)

(73) Assignee: C.E.S. FONIX CLEAR WATER KFT., Veröce (HU)

( * ) Notice: Subject to any disclaimer, the term of this patent is extended or adjusted under 35 U.S.C. 154(b) by 419 days.

(21) Appl. No.: 17/918,328

(22) PCT Filed: Mar. 4, 2021

(86) PCT No.: PCT/IB2021/051813
§ 371 (c)(1),
(2) Date: Oct. 12, 2022

(87) PCT Pub. No.: WO2021/176391
PCT Pub. Date: Sep. 10, 2021

(65) Prior Publication Data
US 2023/0192512 A1 Jun. 22, 2023

(30) Foreign Application Priority Data
Mar. 5, 2020 (HU) .................... P2000082

(51) Int. Cl.
C02F 1/34 (2023.01)
(52) U.S. Cl.
CPC .......... C02F 1/34 (2013.01); C02F 2201/003 (2013.01)

(58) Field of Classification Search
CPC ...... C02F 1/34; C02F 1/46; C02F 1/72; C02F 1/32; F22B 3/06; F24J 3/00
See application file for complete search history.

(56) References Cited

U.S. PATENT DOCUMENTS

| 2003/0042174 | A1  | 3/2003 | Austin |
| 2013/0248429 | A1  | 9/2013 | Dahule |
| 2017/0248304 | A1* | 8/2017 | Hrinda ............... F22B 3/06 |

(Continued)

FOREIGN PATENT DOCUMENTS

| CA | 2977259 A1  | 8/2015 |
| CN | 102491553 A | 6/2012 |
| CN | 204508849 U | 7/2015 |

(Continued)

OTHER PUBLICATIONS

WO2017115983A1—EPO Machine Translation (Year: 2025).*

Primary Examiner — Patrick Orme
(74) Attorney, Agent, or Firm — Bayramoglu Law Offices LLC

(57) ABSTRACT

A cavitation water purification apparatus is fitted with a driving motor, an input stud, and an output stud. The cavitation water purification apparatus includes a blade unit, a ring-shaped rotating part, a case, a stationary part, a shield, and cavitation cavities. The cavitation cavities are lined up on the external coating of the stationary part and the internal coating of the case. The external coating of the rotating part is fitted with numerous cavitation ribs, and the internal coating of the rotating part is fitted with cavitation lines. The blade unit is fitted with blades. A procedure for using the cavitation water purification apparatus is further provided.

8 Claims, 7 Drawing Sheets

(56) References Cited

U.S. PATENT DOCUMENTS

2017/0275187 A1* 9/2017 Asami ................ B01D 17/0217

FOREIGN PATENT DOCUMENTS

| | | | |
|---|---|---|---|
| CN | 106186179 A | 12/2016 | |
| CN | 107344029 A | 11/2017 | |
| EP | 3030343 A1 | 6/2016 | |
| HU | 0800348 A2 | 12/2012 | |
| HU | 1100275 A2 | 12/2012 | |
| HU | 1400322 A2 | 12/2015 | |
| RU | 2585635 C1 | 5/2016 | |
| SI | 24180 A | 3/2014 | |
| UA | 22956 U | 4/2007 | |
| UA | 63974 U | 10/2011 | |
| UA | 69614 U | 5/2012 | |
| UA | 84014 U | 10/2013 | |
| WO | WO-2017115983 A1 * | 7/2017 | ............. F04D 13/06 |

* cited by examiner

APPARATUS AND PROCEDURE FOR CAVITATION WATER PURIFICATION

CROSS REFERENCE TO THE RELATED APPLICATIONS

This application is the national phase entry of International Application No. PCT/IB2021/051813, filed on Mar. 4, 2021, which is based upon and claims priority to Hungarian Patent Application No. P2000082, filed on Mar. 5, 2020, the entire contents of which are incorporated herein by reference.

TECHNICAL FIELD

The subject of the invention is a cavitation water purification apparatus, which is fitted with a motor, an input stud, and an output stud. The subject of the invention also includes the procedure for using the device.

BACKGROUND

Water purification was practiced in the Egyptian and Roman civilizations for the first time in history. These societies were already familiar with sewers, with which they also sought to drain and dispose of the accumulated sewage. Later, as large cities were commonly located along rivers, the waters of rivers were used to drain sewage. As a result, the river waters became polluted, and thus drinking water also became polluted. Major cities attempted to filter their waters by coastal cleaning. This means, in essence, that attempts were made to solve the turbidity of the wastewater by removing floating contaminants. For this purpose, filters and grills were used and installed at and before the discharge points of canals. In the early days, it was a serious breakthrough in water treatment that wastewater was not only filtered and pumped, but also pre-sedimented. Later, sedimentation basins were created in the $20^{th}$ century. Today, a number of physical and chemical methods are known for disinfecting drinking water. However, these processes may produce mutagenic and carcinogenic by-products, and the performance of some processes may be limited by the slowness of material transfer processes. An additional problem may be that certain microorganisms form colonies, or their spores form spherical clusters, so that chemical treatments in such systems only destroy cells located on the surface, leaving the interior cells intact. Thus, it is appropriate to seek a disinfection procedure that is free from the disadvantages and limitations mentioned above. Cavitation, together with the spectacular side effects that come with it, offers an option to solve the task of water disinfection. Cavitation is a phenomenon that occurs in liquids. The first observations of hydrodynamic cavitation are related to damages to the surfaces of solid bodies moving and rotating at high speeds in liquids (e.g. propellers). The essence of the phenomenon is that if the pressure in the flow space drops below the vapor pressure for a short time, a vapor bubble (cavity) is formed inside the liquid, and then as the pressure increases, this cavity disappears (collapses). This is accompanied by high temperatures, high pressures, light phenomena, electrical phenomena and particularly powerful mechanical shock waves. An essential feature of this phenomenon is that a cavitation bubble and its associated phenomena exist or take place for a very short time and are limited to a small space, but, at the same time, there can be a very large number of cavitation cavities in a flow space. Cavitation can also occur as a result of ultrasonic excitation of liquids. In such a situation, the pressure of a liquid may fall under the vapor pressure as a result of pressure fluctuations in the mechanical wave field. It is also known that cavitation can also be triggered through excitation by optical means or particles.

The state of the art includes the following solutions.

Chinese utility model application No CN204508849 describes a cavitation apparatus for purifying contaminated water and removing liquid organic matter. The apparatus includes a vortex pump and an ozone generator, and the rotating impeller of the pump creates cavitation bubbles in conical cavities along the wall of the apparatus.

Chinese patent description No. CN107344029 describes an apparatus for separating oil and water, which also uses cavitation for more thorough water purification. Oxidation bubbles are created in the apparatus; such bubbles are less than 200 nanometres in size, and they can adhere to oil contaminants and break up longer molecular chains of contaminants. The purification effect can be improved by using cavitation.

Chinese publication document No. CN106186179 describes a water purification system that is based on hydrodynamic cavitation. The system uses cavitation only; water is not treated with chemicals, so secondary contaminants can be avoided. Compared to conventional physical purification processes, the cavitation system according to the solution is simpler, more efficient, and inexpensive.

Ukrainian utility model application No UA63974 describes a process for the industrial treatment of contaminated water from mining; the process consists of several steps and is based on the phenomenon of cavitation. During water treatment, the contaminant molecules are destroyed and then isolated. As the number of cavitation bubbles increases, the water pressure decreases and a shock wave is created, which is used to purify the water.

Ukrainian utility model application No UA84014 also describes a cavitation-based water treatment apparatus. This equipment is also equipped with ozone generators.

Russian publication document No RU2585635 describes a cavitation-based water purification and disinfection system. An oxygen-air mixture is injected into the cavitation space, and the medium to be cleaned is agitated by a rotating magnetic field, and then the medium is settled and the sludge contaminants are removed.

U.S. patent description No US2013248429 also describes an apparatus for water purification in which contaminated water is treated using cavitation and ultraviolet light. Cavitation bubbles are created in the apparatus by rotatable plates with holes that are placed in the fluid flow. Irradiation with ultraviolet light is used to kill microbes (microorganisms).

Ukrainian utility model description No UA22956 describes a cavitation-based process for refining liquid hydrocarbons. During the process, liquid hydrocarbons, such as petroleum or oil derivatives, are mixed with water and absorbent catalysts, and then cavitation is used to separate hydrocarbons from water, hydrogen sulphide, and other materials.

U.S. publication document No US2003042174 also describes a process in which various hydrocarbons are released from an emulsified hydrocarbon mixture by cavitation only, without any additional heating, catalysts and other auxiliaries. The high temperature and pressure caused by cavitation helps to break down the emulsion, and thus better quality petroleum products with lower emissions can be produced. The cavitation treatment of the emulsion can be performed in several cycles until the desired separation is achieved.

Slovenian patent document No SI24180 describes a water purification device that is based on the phenomenon of cavitation. In the apparatus, cavitation bubbles are created in the gaps between the stators and rotors, which destroy the structure of biological materials and thus purify the water.

Chinese publication document No. CN102491553 describes a system and application method by which contaminated water from oil fields can be treated using cavitation. In the first part of the two-stage process, cavitation is used for separation, while in the second stage, the water undergoes a sterilizing treatment.

Canadian publication document No CA2977259 describes a purification process that does not involve cavitation. For example, benzene, toluene, xylene, polycyclic aromatic hydrocarbons, and other hydrocarbon derivatives can be removed in the process for removing oil derivatives. The solution is based on a composition that contains microorganisms, but does not contain solvents or toxic substances, and the components of which are capable of decomposing various hydrocarbon derivatives.

SUMMARY

The purpose of the invention is to eliminate the shortfalls of the known solutions and to implement an apparatus and a procedure that can operate without harming the environment, can be easily mobilized and can be maximally adapted, and can operate at high efficiency and at low cost.

The inventive step is based on the recognition that an invention, which is more advantageous than the previous ones, may be created by implementing the apparatus according to claim 1. This recognition makes it possible to use cavitation for wastewater purification and to implement an apparatus that is a more cost-efficient and adaptable equipment than the known solutions. Cavitation wastewater purification can be realized on the principle that if a sudden pressure drop occurs in a high-pressure fluid, the material practically disintegrates, its internal continuity is eliminated, and gaps and breaches are formed in it according to the current movement conditions. However, liquids do not disintegrate like solid materials. They do not fall apart into a few pieces, accompanied by some debris, but explode into droplets, filling the available space more or less evenly. Between the drops, small cavities and empty holes are formed. These are literally vacuum bubbles, meaning that they are not vapor bubbles. They do not contain any vapor, but since the boiling point of liquids exposed to vacuum changes drastically in many cases, they cause the surrounding material to micro-vaporize. That is why the bubbles collapse so fast. The collapse of the bubbles causes annihilation. This can destroy nearby contaminants and bacteria within a certain distance.

In line with the desired purpose, the most general implementation form of the solution according to the invention may be realized according to claim 1. The most general form of the application procedure is described in the main procedural claim. The various implementation forms are described in the sub-claims.

The solution, generally, is a cavitation water purification apparatus, which is fitted with a motor, an input stud, and an output stud. A distinctive feature of the invention is that it includes a blade unit, a ring-shaped rotating part, a case, a stationary part, a shield, and cavitation cavities, and the cavitation cavities are lined up on the external coating of the stationary part and the internal coating of the case, and the external coating of the rotating part is fitted with numerous cavitation ribs, and its internal coating is fitted with cavitation lines, and the blade unit is fitted with blades.

In another implementation form, a rotating part is fixed onto the axis of the motor, and the rotating part is located within the case, and a blade unit is located between the rotating part and the motor inside the case, and it is mounted onto the case.

In another implementation form, the stationary part is located inside the rotating part, and the case is closed by a shield.

In another implementation form, a cavitation head is located in the cavitation cavities. In yet another implementation form, each cavitation rib includes a cavitation profile pair that reaches into the next cavitation rib, and cavitation slots are located between the cavitation profile pairs.

When applying the invention in a general manner, filtered wastewater flows into the apparatus through the input stud. A distinctive feature of the application is that cavitation bubbles are created by the rotating part that rotates around the stationary cavitation cavities with a rotary speed of 2,800/m to 3,500/m, and the nearby bacteria and contaminants are destroyed by collapsing the bubbles, and, finally, water is released through the output stud.

Another method of application of the invention is that water is driven in a vortical manner using the cavitation heads located in the cavitation cavities.

BRIEF DESCRIPTION OF THE DRAWINGS

The invention is presented in more detail below using a drawing of a possible implementation form.

On the attached drawings.

DETAILED DESCRIPTION OF THE EMBODIMENTS

Figure 1:
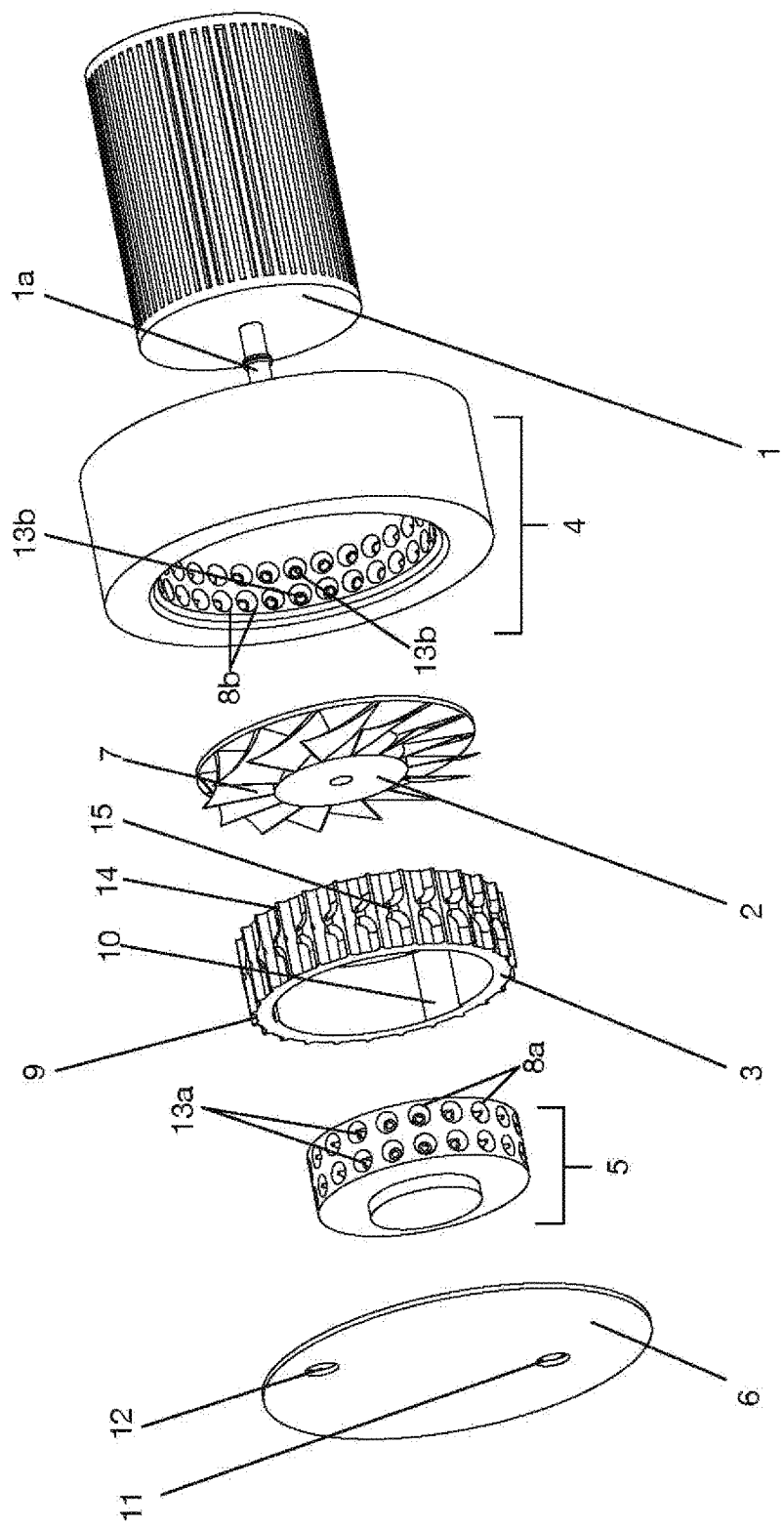
FIG. 1 shows an exploded drawing of the apparatus.

FIG. 1 shows the motor 1, the axis 1*a*, the blade unit 2, the rotating part 3, the case 4, the stationary part 5, the shield 6, the blade 7, the cavitation cavities 8*a*, 8*b*, the cavitation rib 9, the cavitation line 10, the input stud 11, the output stud 12, the cavitation heads 13*a*, 13*b*, the cavitation profile pair 14, and the cavitation slot 15. The motor 1 is connected to the rotating part 3 through the axis 1*a*. The case 4 is located next to the motor 1, and it contains the blade unit 2, the rotating part 3, and the stationary part 5, and it is closed by the shield 6. Cavitation cavities 8*b* are located on the internal coating of the case 4, and one cavitation head 13*b* is located in each cavitation cavity 8*b*. The cavitation cavities 8*b* and cavitation heads 13*b* are there to generate cavitation bubbles and make the liquid flow in a vortical manner. The blade unit 2 is fitted with blades 7. As a consequence of their design, the blades 7 move and facilitate the mixing of the liquid.

Cavitation lines 10 are located on the internal coating of the rotating part 3, and cavitation ribs 9 are located on its external coating. Each cavitation rib 9 includes a cavitation profile pair 14 that reaches into the next cavitation rib 9, and cavitation slots 15 are located between the cavitation profile pairs 14. The cavitation ribs 9, cavitation profile pairs 14, and cavitation slots 15 are to crash and mix cavitation bubbles, and to flush the cavitation cavities 8a, 8b. Cavitation cavities 8a are located on the external coating of the stationary part 5, and one cavitation head 13a is located in each cavity. The cavitation cavities 8a and cavitation heads 13a play the same role as the cavitation cavities 8b and cavitation heads 13b. An input stud 11 and an output stud 12 is located on the shield 6. The input stud 11 is used to allow the liquid to enter the apparatus, and the output stud 12 is used to remove the liquid from the apparatus.

Figure 2:
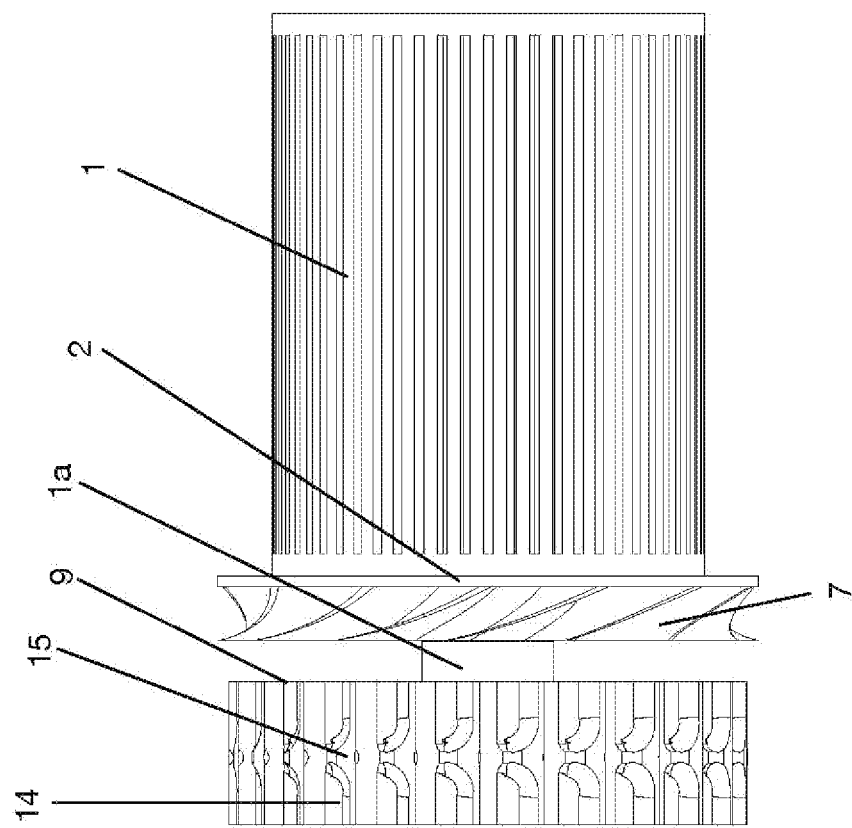
FIG. 2 shows the side-view of the apparatus.

FIG. 2 shows the motor 1, the axis 1a, the blade unit 2, the blades 7, the cavitation ribs 9, the cavitation profile pairs 14, and the cavitation slots 15. The components shown on FIG. 2 are connected to each other as described in FIG. 1.

Figure 3:
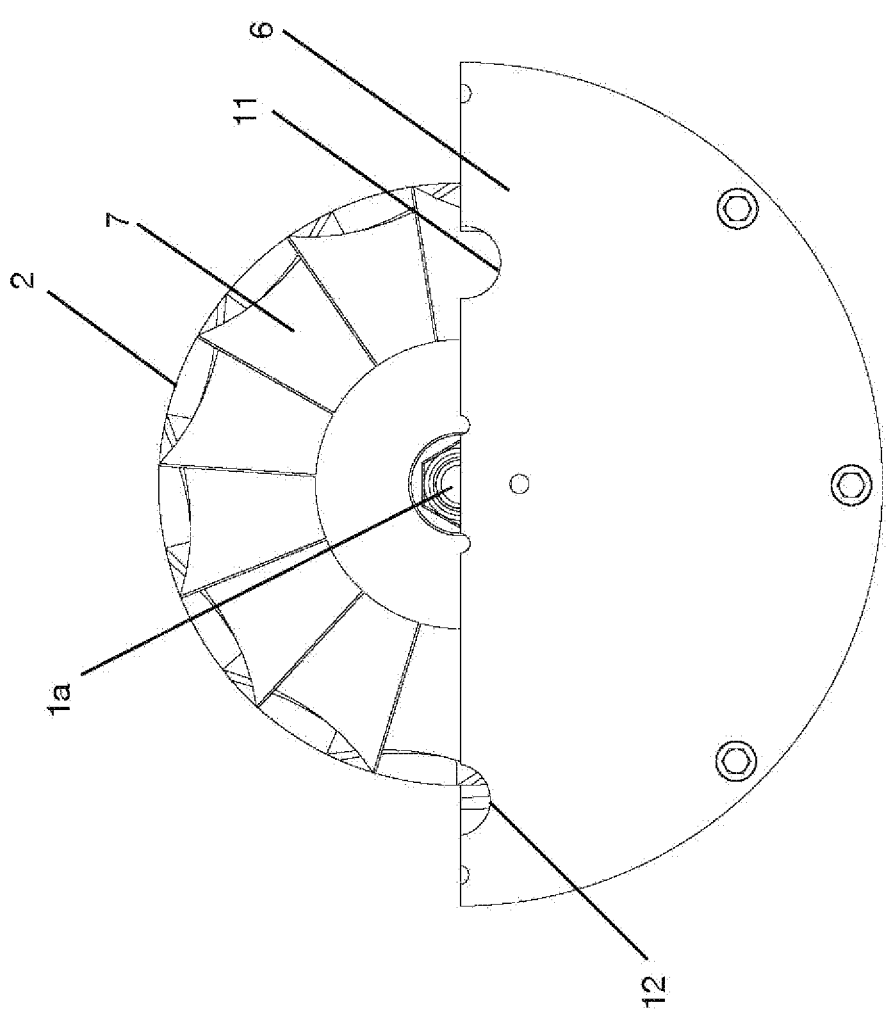
FIG. 3 shows the front-view of the apparatus with the shield 6 cut in half.

FIG. 3 shows the axis 1a, the blade unit 2, the shield 6, the blades 7, the input stud 11, and the output stud 12. FIG. 3 shows the shield 6, the input stud 11, and the output stud 12 cut in half. The components shown on FIG. 3 are connected to each other as described in FIG. 1.

Figure 4:
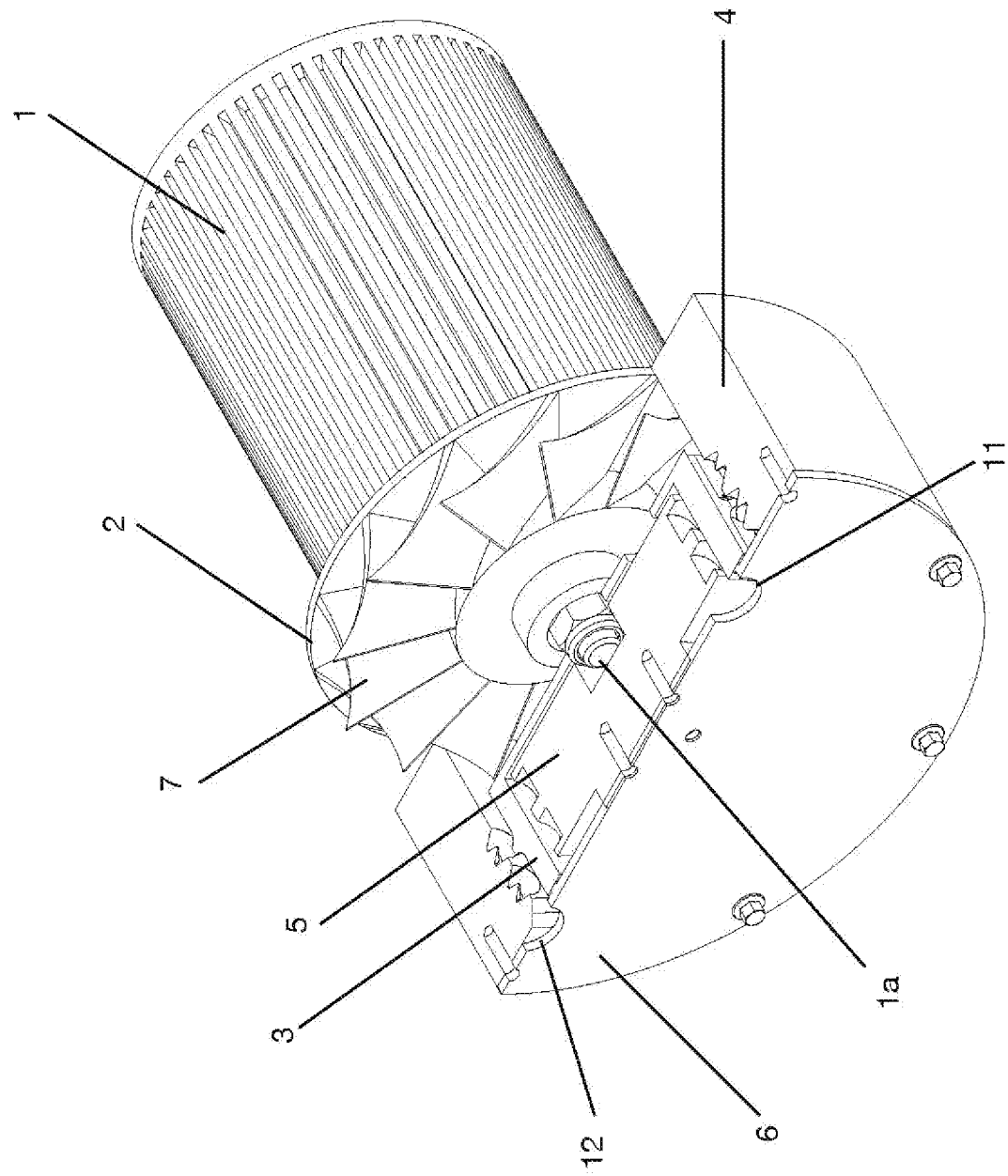
FIG. 4 shows a perspective view of the apparatus partially cut in half.

FIG. 4 shows the motor 1, the axis 1a, the blade unit 2, the rotating part 3, the case 4, the stationary part 5, the shield 6, the blades 7, the input stud 11, and the output stud 12.

FIG. 4 shows the rotating part 3, the case 4, the stationary part 5, the shield 6, the input stud 11, and the output stud 12 cut in half. The components shown on FIG. 4 are connected to each other as described in FIG. 1.

Figure 5:
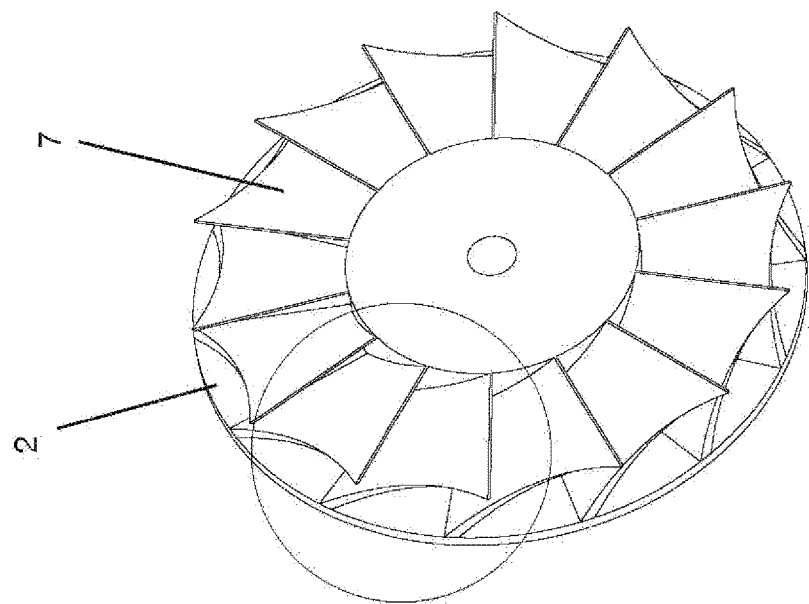
FIG. 5 shows a spatial image of the blade unit 2.

FIG. 5 shows the blade unit 2, which is fitted with blades 7. The blades 7 are to move and facilitate the mixing of the liquid.

Figure 6:
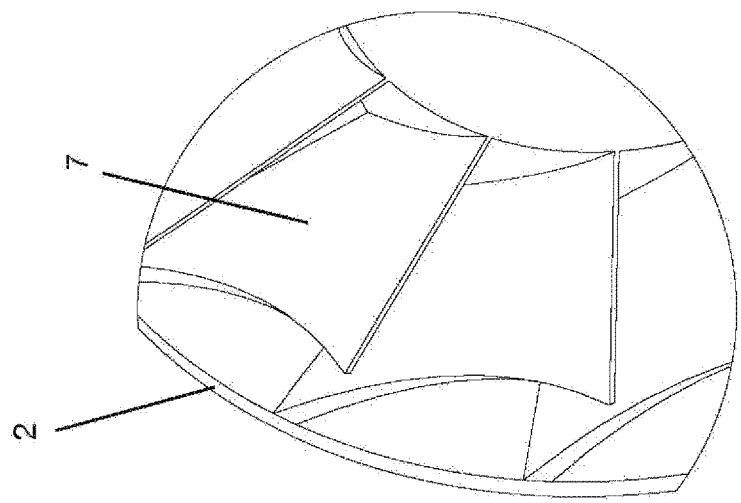
FIG. 6 shows a section of FIG. 5.

FIG. 6 shows an axonometric view of the section marked with a circle on FIG. 5. FIG. 6 shows the blade unit 2, which is fitted with blades 7.

Figure 7:
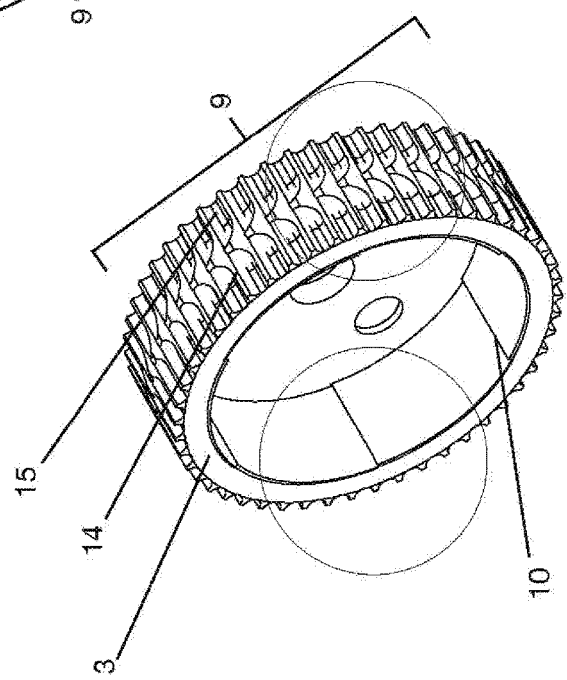
FIG. 7 shows an image of the rotating part 3.

FIG. 7 shows the rotating part 3, the cavitation ribs 9, the cavitation lines 10, the cavitation profile pairs 14, and the cavitation slots 15. The cavitation lines 10 are located on the internal coating of the rotating part 3, and the cavitation ribs 9 are located on its external coating. Each cavitation rib 9 includes a cavitation profile pair 14 that reaches into the next cavitation rib 9, and cavitation slots 15 are located between the cavitation profile pairs 14. Cavitation cavities 8a are located on the external coating of the stationary part 5, and one cavitation head 13a is located in each cavity.

The cavitation ribs 9 and its parts, the cavitation profile pairs 14, and the cavitation slots 15 are to crash and mix cavitation bubbles, and to flush the cavitation cavities 8a, 8b that are not shown on FIG. 7.

Figure 8:
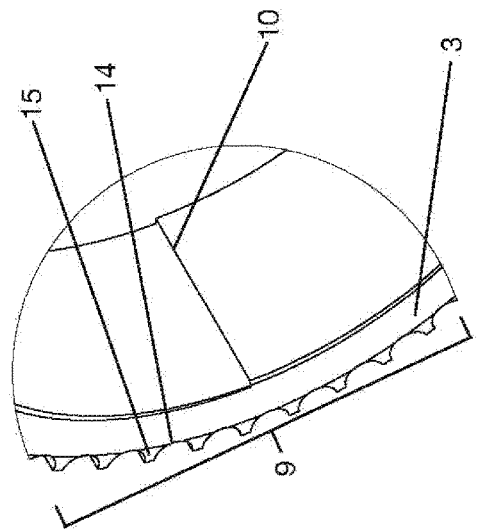
FIG. 8 shows a section of FIG. 7 that falls within the left circle.

FIG. 8 shows the rotating part 3, the cavitation lines 10, the cavitation profile pairs 14, and the cavitation slots 15. The components shown on FIG. 8 are connected to each other as described in FIG. 7.

Figure 9:
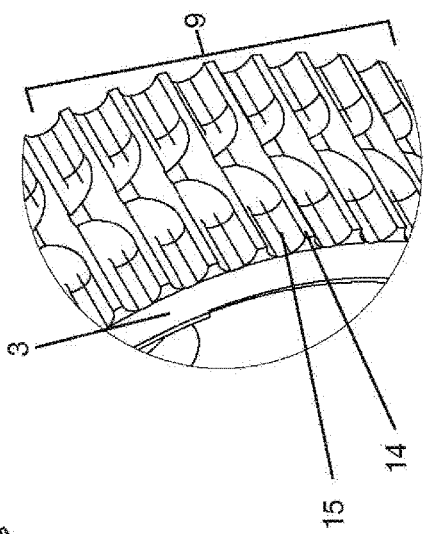
FIG. 9 shows a section of FIG. 7 that falls within the right circle.

FIG. 9 shows the rotating part 3, the cavitation lines 10, the cavitation profile pairs 14, and the cavitation slots 15. The components shown on FIG. 9 are connected to each other as described in FIG. 8.

Figure 10:
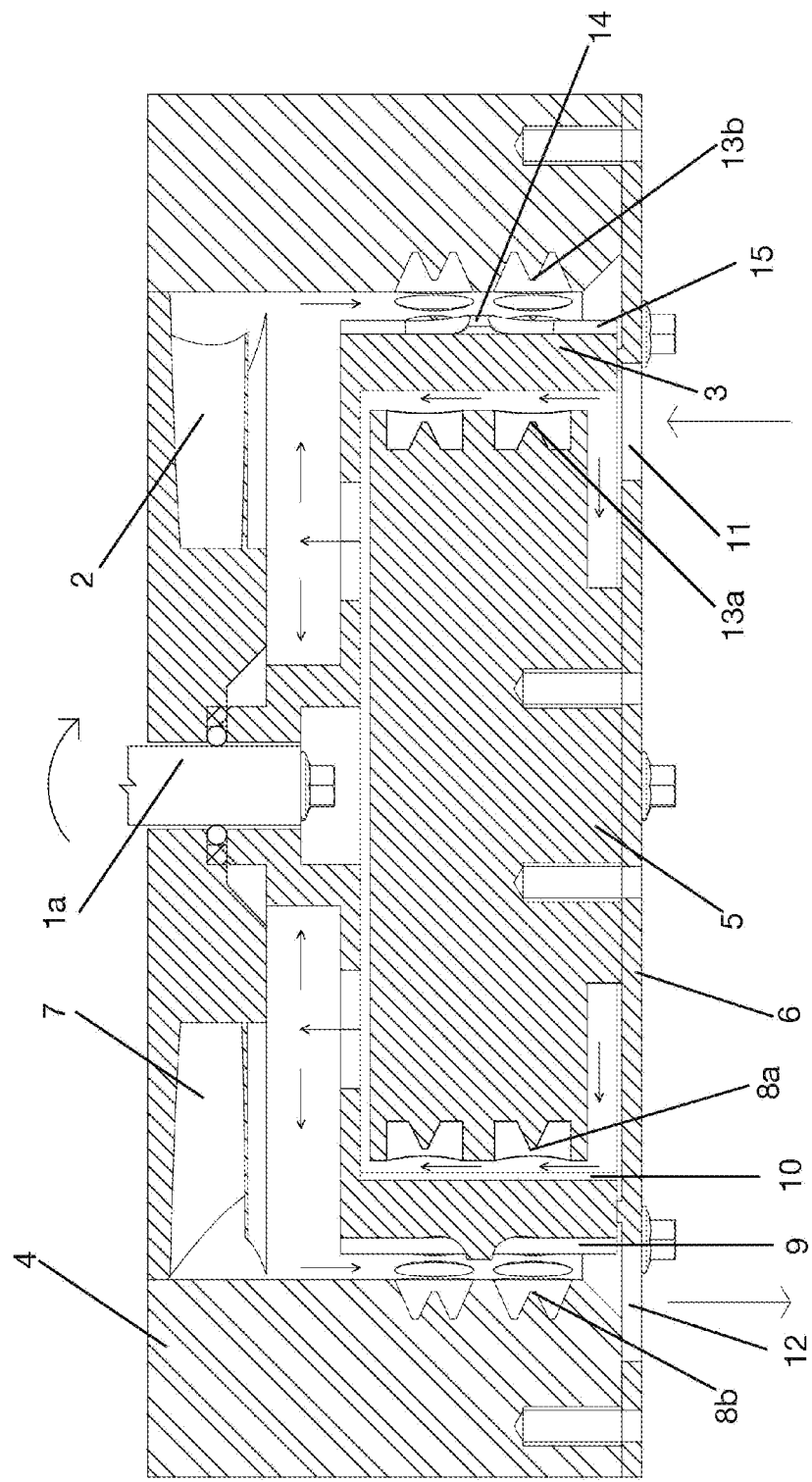
FIG. 10 shows a drawing of a part of the cross-section of the apparatus.

FIG. 10 shows the axis 1a, the blade unit 2, the rotating part 3, the case 4, the stationary part 5, the shield 6, the blades 7, the cavitation cavities 8a, 8b, the cavitation ribs 9, the cavitation lines 10, the input stud 11, the output stud 12, the cavitation heads 13a, 13b, the cavitation profile pairs 14, and the cavitation slots 15. The components shown on FIG. 10 are connected to each other as described in FIG. 1. The arrows shown indicate the flow direction of the liquid.

In the course of applying the invention, wastewater flows into the apparatus through the input stud 11. The input wastewater is already filtered and free from prior rough contamination. Inside the apparatus, the wastewater is located between the stationary part 5 and the rotating part 3, and the rotating part 3 and the case 4. The rotating part 3, together with the cavitation ribs 9 and cavitation lines 10 located on it, rotates. The rotating part 3 is connected to the axis 1a, which is connected to the motor 1. This motor 1 drives the rotating part 3. In our implementation form, the rotating part 3 is mounted onto the axis 1a of the motor 1 directly. As a consequence, the rotating part 3 can operate with a maximum rotary speed of 2900 1/minute when connected to a 50 Hz network; if connected to a 60 Hz network, this rotary speed is 3400p. Rotation is performed around the case 4 with cavitation cavity 8b and the stationary part 5 with cavitation cavity 8a. As a result of this rotation, cavitation bubbles are generated and then collapse, and this reduces the quantity of bacteria and contamination in the water inside the apparatus. In the meantime, the blades 7 of the blade unit 2 facilitate the moving and mixing of the liquid. Finally, the water is released through the output stud 12.

The apparatus described above has numerous advantages. An advantage of cavitation-based water purification apparatuses is that less chemicals need to be used to achieve the desired effect, meaning that healthier drinking water can be produced in an economical way and with less energy investment. The advantages of this invention stand out from among the cavitation-based water treatment devices. An advantage of this invention is that cavitation bubbles are not produced using highly complex, sensitive, expensive equipment, but using cheaper, simpler devices. Furthermore, the consumption of the equipment is also lower, which means that significant cost savings can be realized using the apparatus, and its use has almost no adverse effect on the environment. In addition, the operating costs of the equipment can be easily planned. Furthermore, the equipment can be easily mobilized and fully adapted to the given conditions, and its dimensions and parameters can be designed taking into account the given needs, and it can operate anywhere in the world. For this reason, the apparatus can be used effectively even at locations where it has not previously been possible to purify water.

The invention can be applied on the field of water treatment and the treatment of urban and industrial wastewater. In addition to the above examples, the invention can be implemented in other forms within the scope of protection.

What is claimed is:

1. A cavitation water purification apparatus, wherein the cavitation water purification apparatus is fitted with a driving motor, an input stud, and an output stud;
   wherein the cavitation water purification apparatus comprises a blade unit, a ring-shaped rotating part, a case, a stationary part, a shield, and cavitation cavities; wherein
   the cavitation cavities are lined up on an external coating of the stationary part and an internal coating of the case;
   an external coating of the ring-shaped rotating part is fitted with a plurality of cavitation ribs, and an internal coating of the ring-shaped rotating part is fitted with cavitation lines; and
   the blade unit is fitted with blades, wherein each cavitation rib of the plurality of cavitation ribs comprises a cavitation profile pair, wherein the cavitation profile pair reaches into a next cavitation rib, and cavitation slots are located between cavitation profile pairs.

2. The cavitation water purification apparatus according to claim 1, wherein the ring-shaped rotating part is fixed onto an axis of the driving motor; and the blade unit is located between the ring-shaped rotating part and the driving motor inside the case, and the blade unit is mounted onto the case.

3. The cavitation water purification apparatus according to claim 2, wherein the stationary part is located inside the ring-shaped rotating part.

4. The cavitation water purification apparatus according to claim 2, wherein cavitation heads are installed in the cavitation cavities.

5. The cavitation water purification apparatus according to claim 1, wherein the stationary part is located inside the ring-shaped rotating part.

6. The cavitation water purification apparatus according to claim 5, wherein cavitation heads are installed in the cavitation cavities.

7. A procedure for an application of the cavitation water purification apparatus according to claim 1, wherein filtered wastewater flows into the cavitation water purification apparatus through the input stud, wherein cavitation bubbles are created by the ring-shaped rotating part, wherein the ring-shaped rotating part rotates around the stationary cavitation cavities with a rotary speed of 2,800/m to 3,500/m; and the cavitation bubbles are collapsed, and water is released through the output stud.

8. The procedure according to claim 7, wherein water is driven in a vortical manner in the cavitation cavities.

* * * * *